April 12, 1938.  F. L. THOMPSON  2,113,908
TRAP
Filed Jan. 19, 1937   2 Sheets-Sheet 1
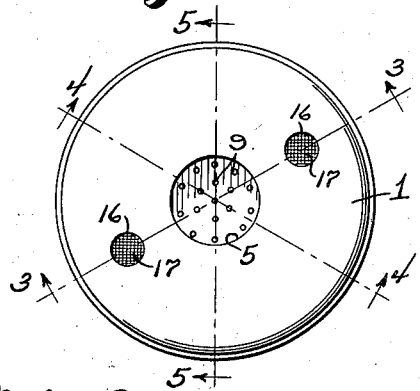
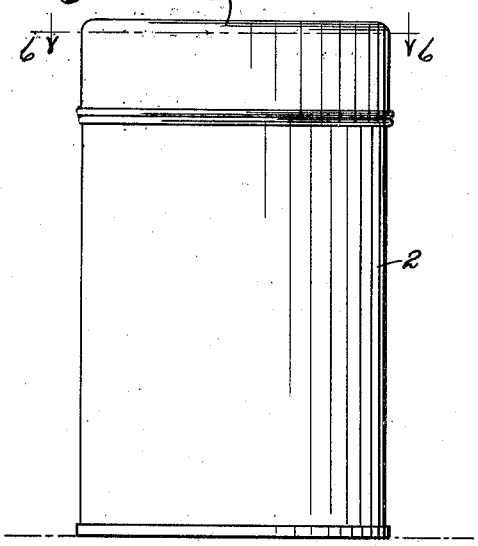
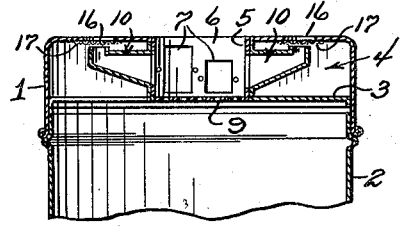
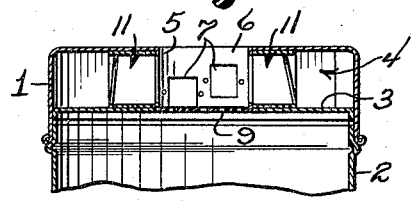
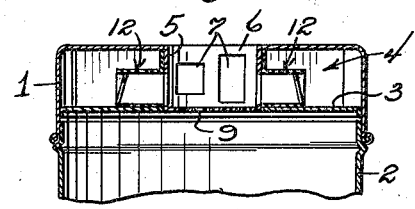
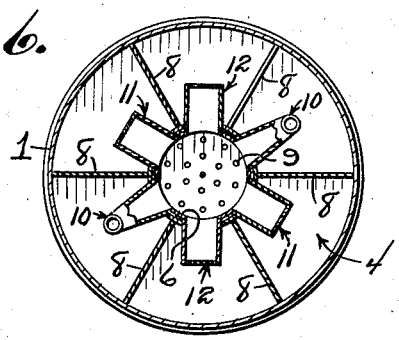
Frank L. Thompson
INVENTOR
BY Victor J. Evans & Co.
ATTORNEYS

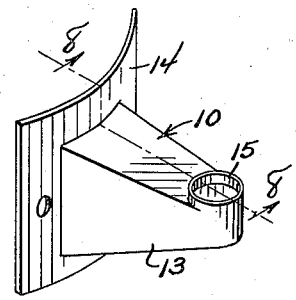
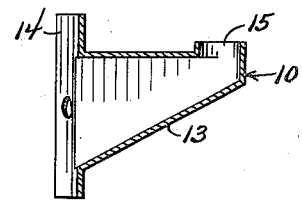
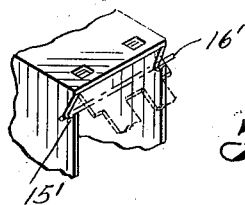
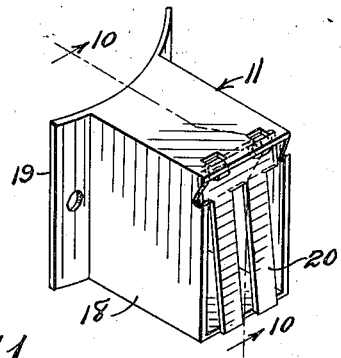
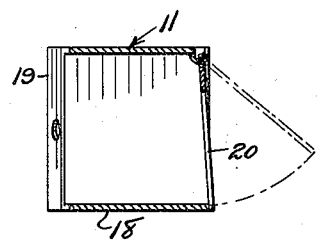
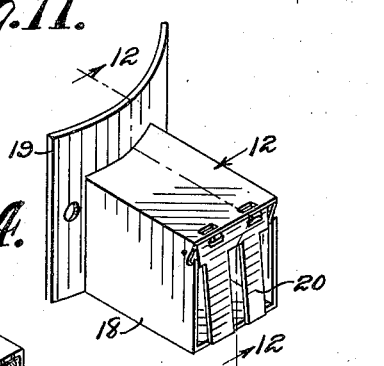
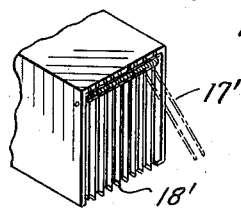
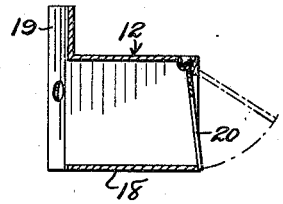

Patented Apr. 12, 1938

2,113,908

UNITED STATES PATENT OFFICE 2,113,908

TRAP

Frank L. Thompson, Oklahoma City, Okla.

Application January 19, 1937, Serial No. 121,345

4 Claims. (Cl. 43—120)

This invention relates to traps especially adapted for trapping insects, rodents, birds and the like and has for the primary object the provision of a device of this character which may be readily adapted to a garbage can or similar container to provide a closure therefor and permit the contents of the can to act as bait in enticing the rodents, flies and the like to be restrained against escape and prevented from reaching the interior of the can or the contents of the latter.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a top plan view illustrating a trap constructed in accordance with this invention.

Figure 2 is a side elevation illustrating the trap adapted to a can or container.

Figure 3 is a fragmentary sectional view taken on the line 3—3 of Figure 1.

Figure 4 is a sectional view similar to Figure 3 and taken on the line 4—4 of Figure 1.

Figure 5 is a view similar to Figures 3 and 4 and taken on the line 5—5 of Figure 1.

Figure 6 is a sectional view taken on the line 6—6 of Figure 2.

Figure 7 is a perspective view illustrating a trap unit constructed for catching insects.

Figure 8 is a sectional view taken on the line 8—8 of Figure 7.

Figure 9 is a perspective view illustrating a trap unit constructed to catch large size rodents.

Figure 10 is a sectional view taken on the line 10—10 of Figure 9.

Figure 11 is a perspective view illustrating a trap unit constructed similar to the trap unit shown in Figure 9 except on a smaller scale for catching small rodents.

Figure 12 is a sectional view taken on the line 12—12 of Figure 11.

Figure 13 is a fragmentary perspective view showing a modification of my invention.

Figure 14 is a fragmentary perspective view showing another modification of my invention.

Referring in detail to the drawings, the numeral 1 indicates a cover of the flanged type adapted for application to a garbage can or container 2 to act as a closure therefor and one of the units of my invention. A wall or false bottom 3 is removably secured in the cover 1 and cooperates with the latter in forming a space 4 opening outwardly through the top of the cover by an opening 5 which provides a main entrance for insects, rodents and the like to the space 4. A sleeve 6 is mounted in the space 4 between the false bottom 3 and the opening 5 and has formed in the walls thereof openings defining doorways 7. Secured to the false bottom 3 and arranged in the space 4 is a plurality of radially extending partitions 8 dividing the space 4 into a series of segmental-shaped compartments. The false bottom 3 closes one end of the sleeve and has perforations 9 to permit odors from the container 2 to pass into the sleeve and from the latter by way of the main entrance 5 for the purpose of attracting insects, rodents and the like into the sleeve.

Trap units are indicated by the characters 10, 11 and 12. The trap units mentioned are located within the compartments and are detachably secured to the sleeve 6 in alignment with the doorways 7. Said trap units will permit the rodents, insects or the like to pass into the different compartments and be restrained therein. The trap unit 10 consists of a body portion 13 having one end fully open and aligned with an entrance of the sleeve and provided at said end with an attaching flange 14 bolted or otherwise detachably secured to the sleeve. The body 13 tapers towards its other end and has said last-named end directed upwardly to form an exit 15 spaced a limited distance from the top wall of the closure, the top wall of said closure being provided with openings 16 in alignment with the exit 15 to permit light to enter the closure or the compartments in which the trap units 10 are located. The openings 16 are closed by wire mesh 17, the trap units 10 being of the construction described are especially adapted for admitting flies or similar insects into certain of the compartments 4, the openings 16 being so arranged with respect to the exit 15 that the insects will be attracted by the daylight and become congregated within the last-named compartments. Any number of trap units 10 may be selected for use with my invention.

The trap units 11 and 12 are similarly constructed and are for the purpose of directing rodents into certain of the compartments of the closure and restrain them in said compartments after entering therein. The units 11 and 12 each consist of a body portion 18 fully open at one end and has said end arranged in close proximity to one of the entrances 7 and equipped at said end with flanges 19 detachably secured to the sleeve 6.

The opposite end of the body 18 is equipped with a gravity actuated slatted gate 20. This gate will readily open from pressure applied thereto from within the body 18. Thus it will be seen that a rodent entering the body 18 from the sleeve may pass into a compartment of the closure by forcing the gate 20 open and after passing said gate the latter will gravitate to a closed position and restrain the rodent within the compartment. The materials used in the construction of the trap units may be of any kind suitable for the purpose and it is to be noted that this device can be easily taken apart for cleaning and reassembled whenever desired, the false bottom 3 being removable from the closure and the sleeve and partition being removable from the closure along with the false bottom brings the trap units into position whereby they may be easily detached from the sleeve.

If desired, suitable mirrors (not shown) may be positioned within the compartments of the closure for reflecting the insects and rodents while within the sleeve so that they will be led to believe other rodents or insects are within the compartments and thereby be tempted to enter said compartments by way of the trap units.

The portion 18 may have notches to receive a stick 16' for propping the door open. The door also as shown in Figure 14 may be made of a plurality of closely related parallel bars 17' and the lower edge of the portion 18 provided with notches 18' to receive the bars 17' when in a full depending position.

Having described the invention, I claim:

1. A trap comprising a closure for a container and having an opening providing a main entrance, a wall removably mounted in the closure and cooperating therewith in forming a space, means for dividing said space into a plurality of compartments and providing separable entrances to said compartments from the main entrance, and trap units connected with said entrances and arranged within the compartments.

2. A trap comprising a closure for a container and having an opening providing a main entrance, a removable wall mounted in said closure to form a space therein, a plurality of radially arranged partitions carried by said wall and engaging the closure to divide the space into a plurality of compartments, a sleeve having entrances and engageable with the wall, partitions and closure, and a plurality of trap units detachably secured to said sleeve and arranged in the compartments.

3. A trap comprising a closure for a container and having an opening providing a main entrance, a removable wall mounted in said closure to form a space therein, a plurality of radially arranged partitions carried by said wall and engaging the closure to divide the space into a plurality of compartments, a sleeve having entrances and engageable with the wall, partitions and closure, a plurality of trap units detachably secured to said sleeve and arranged in the compartments and each including a body having an open end detachably secured to the sleeve and its opposite end equipped with means to permit the passing of rodents from the sleeve to the compartments and to restrain the rodents within the compartments.

4. A trap comprising a closure for a container and having an opening providing a main entrance, a removable wall mounted in said closure to form a space therein, a plurality of radially arranged partitions carried by said wall and engaging the closure to divide the space into a plurality of compartments, a sleeve having entrances and engageable with the wall, partitions and closure, a plurality of trap units detachably secured to said sleeve and arranged in the compartments, and each including a body open at one end and detachably secured to the sleeve in alignment with the entrance of the latter, certain of said bodies having the opposite ends angularly disposed and open to form exits to permit passing of insects into the compartments, and gates adapted to the other bodies to admit rodents to compartments and restrain them therein.

FRANK L. THOMPSON.